United States Patent
Henderson

(10) Patent No.: US 7,911,512 B2
(45) Date of Patent: Mar. 22, 2011

(54) IMAGE SENSOR WITH READOUT CIRCUIT

(75) Inventor: Robert Henderson, Edinburgh (GB)

(73) Assignee: STMicroelectronics Ltd., Marlow, Buckinghamshire (GB)

( * ) Notice: Subject to any disclaimer, the term of this patent is extended or adjusted under 35 U.S.C. 154(b) by 834 days.

(21) Appl. No.: 10/405,904

(22) Filed: Apr. 2, 2003

(65) Prior Publication Data
US 2003/0193595 A1     Oct. 16, 2003

(30) Foreign Application Priority Data

Apr. 2, 2002   (EP) ..................... 02252385

(51) Int. Cl.
*H04N 9/68* (2006.01)
*H04N 5/335* (2006.01)
(52) U.S. Cl. ...................... 348/234; 348/302
(58) Field of Classification Search .......... 348/302, 348/307, 308, 310, 243, 241
See application file for complete search history.

(56) References Cited

U.S. PATENT DOCUMENTS

| | | | | |
|---|---|---|---|---|
| 5,153,421 A | * | 10/1992 | Tandon et al. | 250/208.1 |
| 6,362,767 B1 | * | 3/2002 | Yang et al. | 341/155 |
| 6,809,766 B1 | * | 10/2004 | Krymski et al. | 348/296 |
| 6,965,407 B2 | * | 11/2005 | Boemler et al. | 348/302 |

FOREIGN PATENT DOCUMENTS

| | | |
|---|---|---|
| EP | 0 617 552 | 9/1994 |
| WO | 99/44359 | 9/1999 |

* cited by examiner

*Primary Examiner* — Nicholas G Giles
(74) *Attorney, Agent, or Firm* — Lisa K. Jorgenson; Allen, Dyer, Doppelt, Milbrath & Gilchrist, P.A.

(57) ABSTRACT

An image sensor has an array of pixels. Each column has a first and a second column line connected to a read-reset amplifier/comparator which acts in a first mode as a unity gain buffer amplifier to reset the pixels via the first lines, and in a second mode acts as a comparator and AD converter to produce digitized reset and signal values. The reset and signal values are read out a line at a time in interleaved fashion. Reset values are stored in a memory and subsequently subtracted from the corresponding signal values. The arrangement reduces both fixed pattern and kT/C noise.

17 Claims, 4 Drawing Sheets

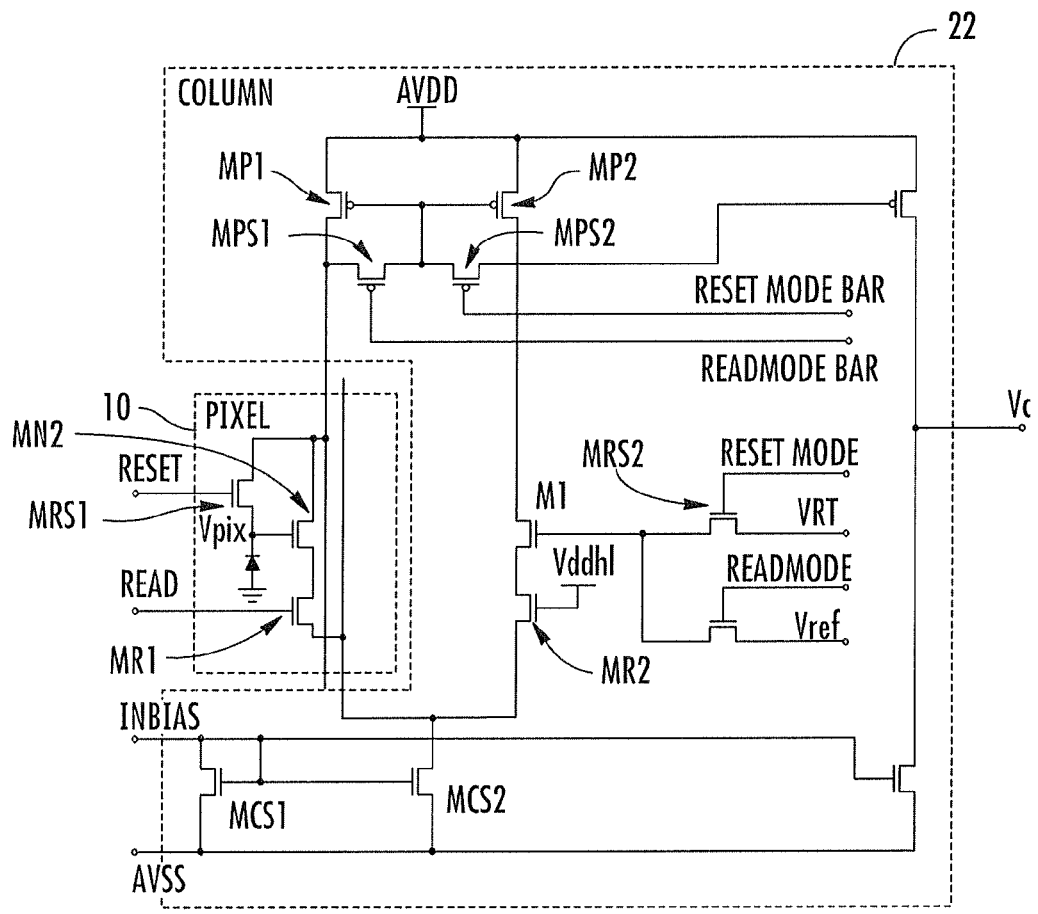
FIG. 2
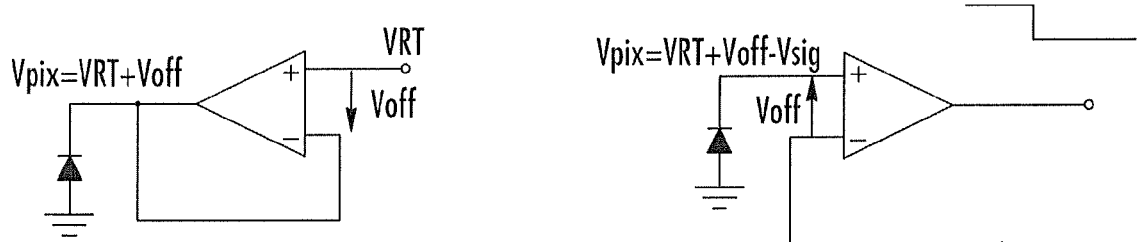
FIG. 3A
FIG. 3B

IMAGE SENSOR WITH READOUT CIRCUIT

FIELD OF THE INVENTION

This invention relates to solid state active pixel image sensors, and more particularly to CMOS image sensors, e.g. having active pixels each including a photodiode and three transistors.

BACKGROUND OF THE INVENTION

An image sensor of the type having active pixels each including a photodiode and three transistors commonly uses the technique known as Correlated Double Sampling (CDS) in which two sampling steps are used whereby a reset voltage and a signal voltage for each pixel are stored on capacitors in the column, and the difference between these voltages is processed by the readout chain. CDS improves fixed pattern noise in the final image, but although the subtraction process removes low frequency pixel noise it increases high frequency noise. The requirement for two readout steps limits the maximum operating frequency of the camera, and the provision of the storage capacitors increases the column area and contributes kT/C sampling noise.

European Patent Application 0130543.6 filed Oct. 5, 2001 by the present Assignee discloses a 3-transistor pixel image sensor using a read-reset amplifier which operates in reset mode to apply a reset voltage and in read mode it operates as a comparator.

Also, European Patent Application 01310582.0 filed Dec. 19, 2001 to the present Assignee discloses an image sensor in which readout of reset and read values is effected one line at a time and interleaved, with a controllable amount of offset between resetting a line and reading that line, to control exposure. This requires a buffer which is capable of storing an entire frame of reset values, which in practice requires a relatively sizeable DRAM.

SUMMARY OF THE INVENTION

The present invention provides an image sensor and method. The image sensor has an array of pixels. Each column has a first and a second column line connected to a read-reset amplifier/comparator which acts in a first mode as a unity gain buffer amplifier to reset the pixels via the first lines, and in a second mode acts as a comparator and AD converter to produce digitized reset and signal values. The reset and signal values are read out a line at a time in interleaved fashion. Reset values are stored in a memory and subsequently subtracted from the corresponding signal values. The arrangement reduces both fixed pattern and kT/C noise.

BRIEF DESCRIPTION OF THE DRAWINGS

Embodiments of the invention will now be described, by way of example only, with reference to the drawings, in which:

FIG. 2 is a schematic circuit diagram showing part of the circuit of FIG. 1 in more detail;

FIGS. 3a and 3b are schematic diagrams illustrating alternative operating modes of the circuit of FIG. 2;

DETAILED DESCRIPTION OF THE PREFERRED EMBODIMENTS

Figure 1:
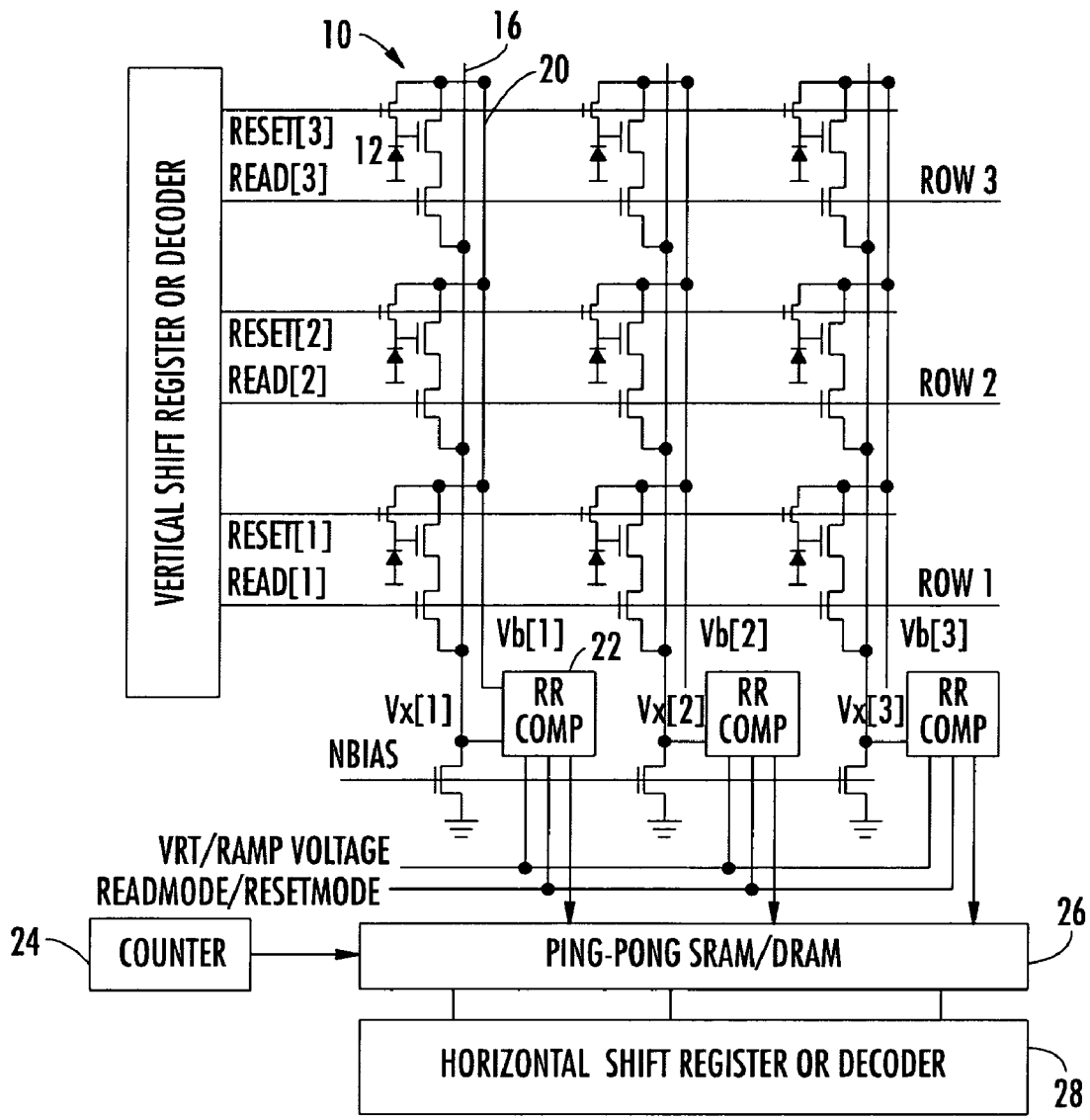
FIG. 1 is a schematic circuit diagram of one example of image sensor embodying the invention.

FIG. 1 shows, by way of example, a 3×3 active pixel array. Each pixel 10 includes a photodiode 12 and a transistor pair MN2, MR1 which forms the upper half of a NMOS source follower structure. Each column contains a column line 16 and a second column line 20. To minimize the capacitance of these two lines, they are best routed in layers of metal with the Vx metal (line 16) above the VRT metal (line 20).

The two column lines 16 and 20 are connected to a Read-Reset Amplifier (RRComp) circuit 22. The RRComp circuit 22 has two modes controlled by signals ReadMode and ResetMode. When a row of pixels is to be reset to a reference voltage VRT, these signals are ReadMode=0 and ResetMode=1 and the RRComp 22 functions as a unity gain buffer amplifier. When a row of pixel voltages is to be read out and converted into digital form, ReadMode=1 and ResetMode=0 and the RRComp 22 functions as an open loop amplifier or comparator. By feeding a ramp voltage to the input of each RRComp 22 the system functions as a single slope A-D converter.

FIG. 2 shows the schematic of the RRComp circuit 22. One such circuit is contained at the base of each column and serves a column of pixels 10, one of which is seen in FIG. 2. The RRComp circuit 22 is essentially a single stage amplifier which uses transistors MR1 and MN2 in the pixel as one half of a differential pair, and the column current source MCS1 and MCS2 as the long tail pair bias current. Transistors MP1 and MP2 form a current source load which can be configured via transistors MPS1 and MPS2. Other transistors MR1, MRS1 are used to read and reset the pixel, respectively. MR2 is present to match MR1 but the gate is always held at VDDHI. MRS2 is used in reset mode to configure the amplifier as a unity gain buffer.

FIG. 2 shows the RRComp 22 configured as a comparator. The output stage is only used when the circuit is configured as a comparator and provides rail-to-rail logic. When the pixel is to be reset, then ResetMode=1, ReadMode=0, ReadModeBar=1 and ResetModeBar=0, configuring the amplifier as a unity gain buffer with output Vpix and input Vout=VRT. While ResetMode=1, the pixel is reset by setting Reset=0. By virtue of resetting the pixel within the feedback loop of the amplifier, the kT/C reset noise is reduced over the gain and bandwidth of the amplifier. Unfortunately the bandwidth of the pixel is much larger than that of the RRComp 22 and so this noise reduction will be small; the situation can be improved by boosting the bias current to the RRComp during reset and increasing the reset switch resistance. Alternatively, the reset pulse fall-time can be increased to allow the amplifier more time to correct for charge injection.

Note that the amplifier resets the pixel to a voltage equivalent to VRT plus the offset of the amplifier Vpix=(VRT+Voff). After the pixel is released from reset, the pixel integrates the light-induced photocurrent and produces a decreasing voltage. When the pixel is to be read, then ReadMode=1, ResetMode=0, ResetModeBar=1 and ReadModeBar=0, configuring the amplifier as a comparator with logic output Vc and intermediate output node Vz. The output gain can be increased by making transistor M1 larger than the pixel source follower transistor Mn2. This introduces a systematic offset into the amplifier but this is cancelled by the operation of the RRComp 22. The achievable gain from this circuit is typically around 45 dB in a 0.35 μm CMOS technology.

The offset of the amplifier is now inverted with respect to the reset mode state. This causes the output Vout=Vpix−Voff, and since the pixel was originally reset to the voltage VRT+ Voff the offset contribution is cancelled. The two modes of operation are summarized in FIG. 3. In this way, the circuit as thus far described cancels fixed pattern noise (FPN) arising from both pixel-to-pixel offset variations due to Vt mismatches of pixel transistors and also column offsets due to mismatches of column amplifiers. When operating as a comparator, the RRComp 22 has an increasing ramp voltage applied to the node Vref. If the voltage Vref exceeds Vpix the output node Vc=AVDD, otherwise Vc=0V.

Reverting to FIG. 1, the way in which the outputs of the RRComps 22 in each column are utilized will now be described. When the comparator changes state, a count value from counter 24 is latched in a corresponding column DRAM/SRAM register 26. This memory is preferably operated in a ping-pong fashion to increase readout speed. The stored count is a digital representation of the pixel voltage for that pixel. The stored voltages for a given line can be read out sequentially by a horizontal shift register or decoder 28. This arrangement is used in a "double read" technique similar to that shown in European Patent Application 01310582.0 filed by the present Assignee. Briefly, lines of reset and read data are read out alternately, with the read data of a given line being delayed or offset from that line's reset data by a given number of line periods selected to control the image exposure.

Figure 4:
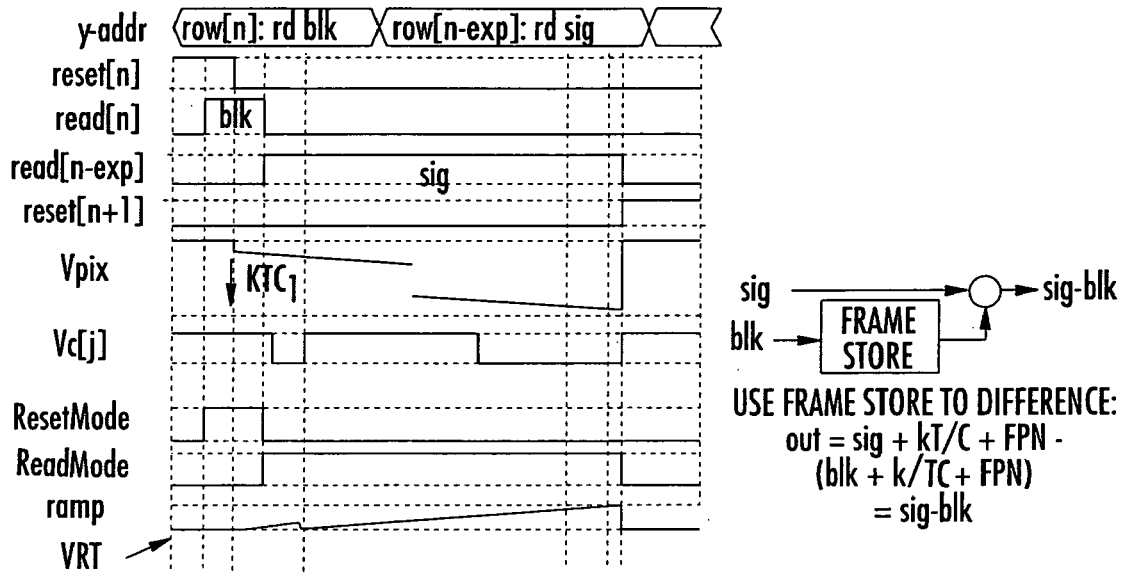
FIG. 4 is a timing diagram for the circuit of FIGS. 2 and 3.
Figure 5:
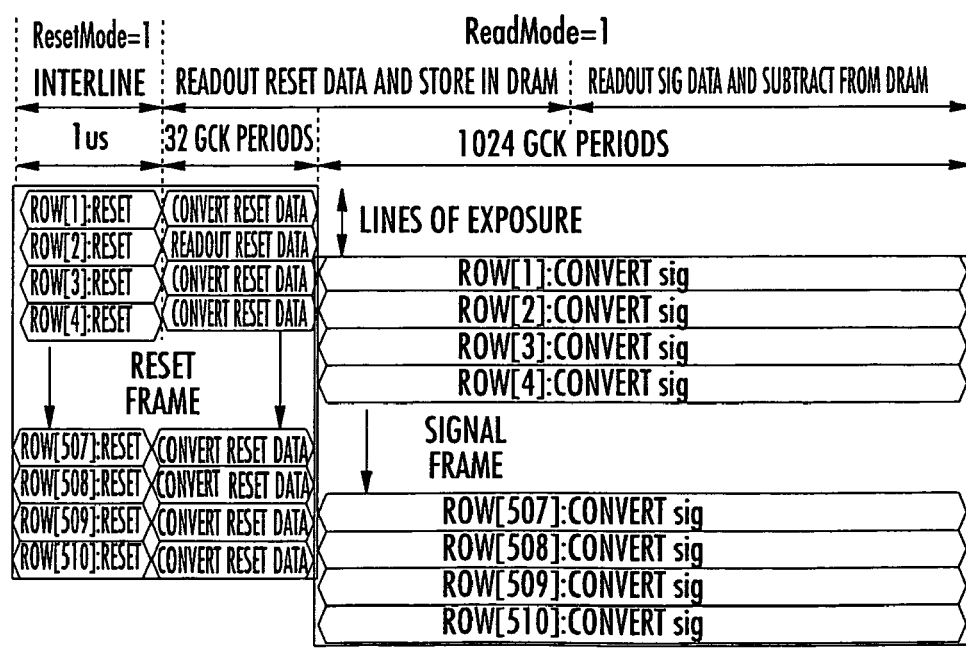
FIG. 5 is a timing diagram showing the same timing as FIG. 4 but in terms of picture lines and clock periods.

FIG. 4 illustrates the timing applied to the circuit of FIGS. 1 and 2 to achieve this, in one embodiment. FIG. 5 shows the same timing in terms of line information. It will be seen that the number of lines of offset between resetting a given row of pixels and reading out their signal data determines the exposure period, and by adjusting the number of lines of offset the exposure of the image can be adjusted. The memory 26 is used to provide this offset, and must be capable of storing an entire frame if the maximum offset is to be available.

The use of RRComps 22 with this technique is of particular advantage. The RRComp reduces the spread of voltages which must be converted in a reset frame and thus reduces the framestore memory requirements. Moreover when configured as an open loop high-gain amplifier or comparator, the RRComp has a very low input referred noise which reduces the remaining readout noise level.

As is also indicated in FIG. 4, the stored reset (Blk) signal is subtracted from the corresponding pixel signal by any suitable subtracting means to give an output signal.

$$Vout = Vpix + \sqrt{(kT/C)} + FPN - (VRT + \sqrt{(kT/C)} + FPN)$$
$$= Vpix - VRT$$

Figure 6:
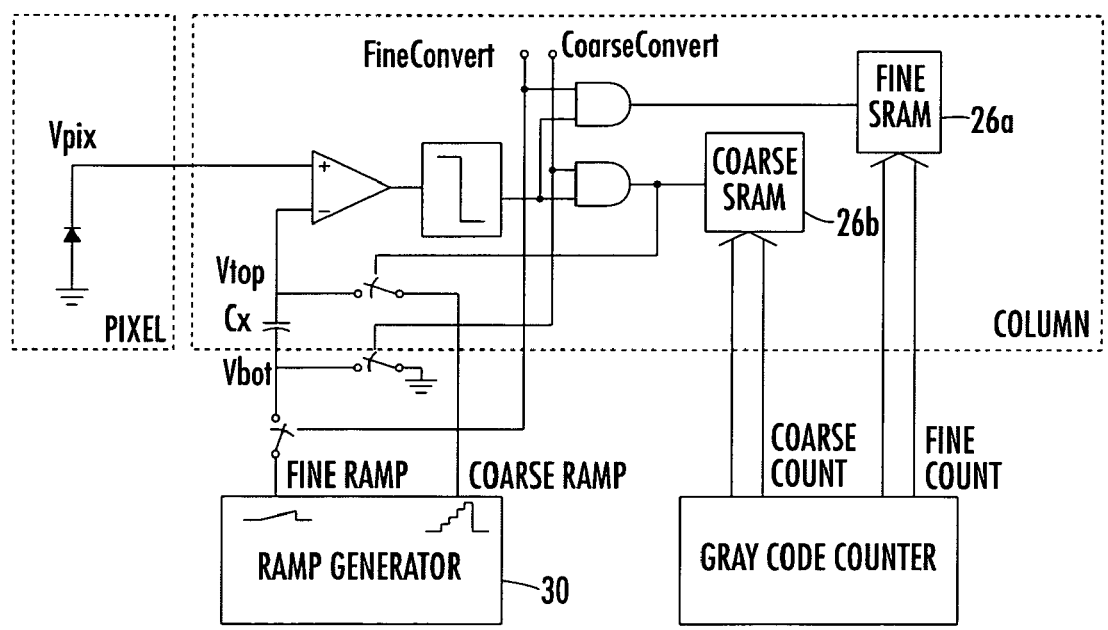
FIG. 6 is a schematic diagram showing a modified form of analog to digital conversion for the present invention.

FIG. 6 shows a modification in which the Read-Reset amplifier is used to provide a two step AD converter. A two-step ADC can reduce power consumption and increase the output conversion rate of a column-parallel single slope AD converter. A ramp generator 30 provides a coarse ramp waveform which comprises a series of steps, and a fine ramp waveform which is a single slope. The coarse ramp voltage drives the inputs of the array of column comparators and also a local capacitor Cx. When the coarse ramp voltage exceeds the voltage on the pixel, the output of the comparator 22 changes from a 1 to a 0, causing ramp switch 32 to close and store the current ramp voltage locally in the column.

In a second conversion phase, CoarseConvert=0 and FineConvert=1, and the fine ramp voltage is applied to the bottom plate of the column capacitors Cx. The column capacitors Cx can be efficiently implemented in NMOS as N-well structures, where the N-well forms the bottom plate and is shared between columns by virtue of always being at a common potential. During the coarse conversion phase, the node Vbot is at approximately a coarse LSB voltage above ground to create a positive system offset for fine ramping. During fine conversion the fine ramp voltage drives Vbot. The fine ramp voltage starts from ground and sweeps over the LSB range of the coarse conversion. Some overrange can be built in to take account of charge injection introduced by the Vtop sampling switch and avoid ramp transient non-linearity.

Note that the deltaV on the Vtop node at the beginning of fine conversion will be around a coarse LSB voltage below the pixel output voltage, by virtue of switching Vbot from a coarse LSB voltage to ground. This will reset all comparators into an output high state. The Cx capacitor size must be chosen for some desired kT/C noise level and charge injection offset. The sampling switch should be minimum geometry.

The coarse ramp must have a much higher drive strength then the fine ramp, since it is driving a set of parallel grounded capacitors Cx with a greater slew rate. However, since the coarse ramp is used for only a brief part of the overall conversion cycle, the coarse ramp can be shut down when it is not in use. The coarse ramp generator must settle to fine LSB level within a clock cycle. The SRAM bank 26 is divided into fine and coarse sub-banks 26a and 26b. These banks receive a fine and a coarse count which is latched by the change of state of the comparator switch 32 during fine and coarse conversion phases.

The present invention thus provides an improved means of reducing fixed pattern noise and kT/C noise. The invention enables a "double read" method to be implemented with a reduced size of frame buffer, potentially allowing SRAM rather than DRAM storage to be used.

That which is claimed is:

1. An image sensor comprising:
   an array of pixels arranged in rows and columns, each pixel comprising a light-sensitive element and switching means for applying a reset signal to the pixel and to read out a pixel signal from the pixel;
   a dual mode common read-reset circuit, in each column, configured
       to operate as a buffer in a first mode to apply the reset signal to the pixels while an output of the dual mode common read-reset circuit is coupled to the pixels, and
       to operate as a comparator in a second mode to read pixel reset signals and pixel signals while an input of the dual mode common read-reset circuit is coupled to the pixels;
   analog-to-digital conversion means for converting the pixel reset signals and the pixel signals from analog to digital; and
   a memory configured to store the digital pixel reset signals of the pixels for up to a complete frame.

2. An image sensor according to claim 1, wherein the analog-to-digital conversion means comprises:
   a ramp generator with an output configured to be set when a ramp voltage equals the pixel signal; and
   a counter configured to provide a count which is latched by the set output.

3. An image sensor according to claim 2, wherein the ramp generator comprises a single slope generator.

4. An image sensor according to claim 2, wherein the ramp generator comprises a coarse ramp generator configured to provide a step-wise ramp and a fine ramp generator configured to provide a single-slope ramp.

5. An image sensor according to claim 1, further comprising subtraction means for subtracting, from the pixel signal of a given pixel, the reset signal of the pixel retrieved from the memory.

6. An image sensor according to claim 1, wherein the memory comprises one of a DRAM and an SRAM.

7. An image sensor comprising:
an array of pixels, each pixel comprising a light-sensitive element and a switching circuit configured to apply a reset signal to the pixel and to read out a pixel signal from the pixel;
a dual mode common read-reset circuit, in each column of the array, configured
to operate as a buffer in a first mode while an output of the dual mode common read-reset circuit is coupled to the pixels for applying the reset signal to the pixels, and
to operate as a comparator in a second mode while an input of the dual mode common read-reset circuit is coupled to the pixels for reading pixel reset signals and pixel signals;
an analog-to-digital converter configured to convert the pixel reset signals and the pixel signals from analog to digital; and
a memory configured to store the digital pixel reset signals of the pixels for up to a complete frame.

8. An image sensor according to claim 7, wherein the analog-to-digital converter comprises:
a ramp generator with an output configured to be set when a ramp voltage equals the pixel signal; and
a counter configured to provide a count which is latched by the set output.

9. An image sensor according to claim 8, wherein the ramp generator comprises a single-slope generator.

10. An image sensor according to claim 8, wherein the ramp generator comprises a coarse ramp generator configured to provide a step-wise ramp and a fine ramp generator configured to provide a single-slope ramp.

11. An image sensor according to claim 7, further comprising a subtraction circuit configured to subtract, from the pixel signal of a given pixel, the reset signal of the pixel retrieved from the memory.

12. An image sensor according to claim 7, wherein the memory comprises one of a DRAM and an SRAM.

13. A method of operating an image sensor comprising an array of pixels arranged in rows and columns, each pixel having a light-sensitive element and switching means for applying a reset signal to the pixel and to read out pixel signals from the pixel, each column having a dual mode common read-reset circuit which operates as a buffer in a first mode to apply the reset signal to the pixels, and also operates as a comparator in a second mode to read pixel reset signals and pixel signals, the method comprising:

operating each dual mode common read-reset circuit in the first mode while an output of the dual mode common read-reset circuit is coupled to the pixels for applying the reset signal to the pixels;
operating each dual mode common read-reset circuit in the second mode while an input of the dual mode common read-reset circuit is coupled to the pixel to read the pixel reset signals and pixel signals and convert them from analog to digital while storing the digital pixel reset signals in a memory, operation in the first and second modes being interleaved by rows; and
subtracting digital pixel reset signals retrieved from the memory from the corresponding digital pixel signals of each row.

14. The method of claim 13, further comprising setting the exposure of the image sensor by adjusting an offset to temporally separate the applying of the reset signal and the reading of the pixel reset signals and pixel signals for each row.

15. An image sensor comprising:
an array of pixels, each pixel comprising a light-sensitive element and a switching circuit configured to apply a reset signal to the pixel and to read out a pixel signal from the pixel, the switching circuit comprising a transistor pair forming an upper half of a source follower, each column of the array including a first column line coupled to a first end of the transistor pair, and a second column line coupled to a second end of the transistor pair;
a dual mode common read-reset amplifier circuit in each column of the array, the transistor pair of each pixel configured to operate as one half of a differential pair and to enable the amplifier circuit to operate as a buffer in a first mode to apply the reset signal to the pixels with an output of the dual mode common read-reset circuit being coupled to the pixels, and to operate as a comparator in a second mode to read pixel reset signals and pixel signals with an input of the dual mode common read-reset circuit being coupled to the pixels;
an analog-to-digital converter configured to convert the pixel reset signals and the pixel signals from analog to digital; and
a memory configured to store the digital pixel reset signals of the pixels for up to a complete frame.

16. An image sensor according to claim 15, wherein the analog-to-digital converter comprises:
a ramp generator with an output configured to be set when a ramp voltage equals the pixel signal; and
a counter configured to provide a count which is latched by the set output.

17. An image sensor according to claim 15, further comprising a subtractor configured to subtract, from the pixel signal of a given pixel, the reset signal of the pixel retrieved from the memory.

* * * * *